United States Patent
Teller

(10) Patent No.: US 9,520,940 B2
(45) Date of Patent: Dec. 13, 2016

(54) METHOD FOR PREVENTING STORAGE OF PROHIBITED DATA ON AN AD HOC MOVING DATA NETWORK

(71) Applicant: X Development LLC, Mountain View, CA (US)

(72) Inventor: Eric Teller, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 13/714,947

(22) Filed: Dec. 14, 2012

(65) Prior Publication Data

US 2014/0171075 A1 Jun. 19, 2014

(51) Int. Cl.

| | |
|---|---|
| *C23C 14/34* | (2006.01) |
| *H04B 10/118* | (2013.01) |
| *H04L 29/08* | (2006.01) |
| *H04W 4/02* | (2009.01) |
| *H04W 8/18* | (2009.01) |
| *H04W 12/08* | (2009.01) |
| *H04W 40/24* | (2009.01) |

(Continued)

(52) U.S. Cl.
CPC ........... *H04B 10/118* (2013.01); *H04L 67/288* (2013.01); *H04L 67/2847* (2013.01); *H04W 4/021* (2013.01); *H04W 8/183* (2013.01); *H04W 12/08* (2013.01); *H04W 40/24* (2013.01); *H04L 63/107* (2013.01); *H04W 48/04* (2013.01); *H04W 84/06* (2013.01); *H04W 84/18* (2013.01)

(58) Field of Classification Search
CPC ............ G06F 17/00; H04B 7/185; H04Q 7/20
USPC ....... 455/456.1, 436; 721/1, 13, 2, 23; 725/5
See application file for complete search history.

(56) References Cited

U.S. PATENT DOCUMENTS

| | | | |
|---|---|---|---|
| 3,070,335 A | 12/1962 | Bohl et al. | |
| 5,519,761 A | 5/1996 | Gilhousen | |

(Continued)

FOREIGN PATENT DOCUMENTS

| | | |
|---|---|---|
| JP | 2000-177695 | 6/2000 |
| WO | 01/76300 | 10/2001 |

(Continued)

OTHER PUBLICATIONS

Grace et al., "LMDS from High Altitude Aeronautical Platforms", Communications Research Group, Department of Electronics, University of York, United Kingdom, 1999.

(Continued)

*Primary Examiner* — Lester Kincaid
*Assistant Examiner* — Gary Lafontant
(74) *Attorney, Agent, or Firm* — McDonnell Boehnen Hulbert & Berghoff LLP

(57) ABSTRACT

The present disclosure provides a method operable in a balloon network. The method can include determining that a balloon is at a location associated with a first legally-defined geographic area, wherein an area profile identifies a list of geographically-prohibited data that is restricted from being cached in the first legally-defined geographic area. The method can also include receiving first data. The method can also include using the list of geographically-prohibited data to determine whether or not the first data is geographically-prohibited data. If the first data is geographically-prohibited data, then the method can further include refraining from storing the first data in data storage at the first balloon.

22 Claims, 7 Drawing Sheets

(51) Int. Cl.
  *H04L 29/06* (2006.01)
  *H04W 84/06* (2009.01)
  *H04W 84/18* (2009.01)
  *H04W 48/04* (2009.01)

(56) References Cited

U.S. PATENT DOCUMENTS

| | | | |
|---|---|---|---|
| 5,590,395 | A | 12/1996 | Diekelman |
| 6,324,398 | B1 | 11/2001 | Lanzerotti et al. |
| 7,356,390 | B2 | 4/2008 | Knoblach |
| 8,001,902 | B2 | 8/2011 | Bass |
| 8,116,763 | B1 | 2/2012 | Olsen |
| 8,566,900 | B1 * | 10/2013 | Bharali et al. .............. 726/1 |
| 8,825,847 | B1 | 9/2014 | Teller et al. |
| 2002/0072361 | A1 | 6/2002 | Knoblach et al. |
| 2003/0217150 | A1 | 11/2003 | Roese et al. |
| 2003/0236070 | A1 | 12/2003 | Seligsohn |
| 2006/0003698 | A1 | 1/2006 | Seligsohn et al. |
| 2006/0030345 | A1 | 2/2006 | Jain |
| 2006/0063529 | A1 | 3/2006 | Seligsohn et al. |
| 2006/0227744 | A1 | 10/2006 | Metke et al. |
| 2007/0112705 | A1 | 5/2007 | Mardirossian |
| 2008/0139114 | A1 | 6/2008 | Ranganathan |
| 2008/0299990 | A1 * | 12/2008 | Knoblach et al. ......... 455/456.1 |
| 2009/0085761 | A1 | 4/2009 | Buer |
| 2009/0098850 | A1 | 4/2009 | Deaton et al. |
| 2010/0121571 | A1 | 5/2010 | Cabral et al. |
| 2011/0177826 | A1 | 7/2011 | Huang et al. |
| 2012/0198069 | A1 | 8/2012 | Black |
| 2013/0205310 | A1 * | 8/2013 | Stahl et al. ....................... 725/5 |
| 2013/0238784 | A1 | 9/2013 | Teller et al. |
| 2014/0335895 | A1 | 11/2014 | Teller et al. |

FOREIGN PATENT DOCUMENTS

| | | |
|---|---|---|
| WO | 2005/060509 | 7/2005 |
| WO | 2005060509 | 10/2005 |
| WO | 2010/010452 A1 | 1/2010 |

OTHER PUBLICATIONS

International Search Report for corresponding PCT application No. PCT/US2013/069866, dated Feb. 28, 2014.
European communication for application No. 13862768.2 dated Jul. 20, 2016.

* cited by examiner

METHOD FOR PREVENTING STORAGE OF PROHIBITED DATA ON AN AD HOC MOVING DATA NETWORK

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, the present disclosure provides a computer-implemented method. The method can include determining that a balloon is at a location associated with a first legally-defined geographic area, wherein an area profile identifies a list of geographically-prohibited data that is restricted from being cached in the first legally-defined geographic area. The method can also include receiving first data. The method can also include using the list of geographically-prohibited data to determine whether or not the first data is geographically-prohibited data. If the first data is geographically-prohibited data, then the method can further include refraining from storing the first data in data storage at the first balloon.

In another aspect, the present disclosure provides a computer-implemented method. The method can include determining that a balloon is at a location associated with a first legally-defined geographic area, wherein an area profile indicates, for each of one or more second legally-defined geographic areas, a list of geographically-prohibited data that is restricted from being cached in the respective second legally-defined geographic area. The method can also include receiving first data. The method can also include using the list of geographically-prohibited data for at least one of the second legally-defined geographic areas to determine whether or not the first data is geographically-prohibited data in the at least one of the second legally-defined geographic area. The method can also include routing the first data towards a destination based on the determination as to whether or not the first data is geographically-prohibited.

In yet another aspect, the present disclosure provides a computer-readable medium storing instructions that, when executed by one or more processors in a computing device, cause the computing device to perform functions. The functions can include determining that a balloon is at a location associated with a first legally-defined geographic area. The functions can also include receiving first data. The functions can also include using a list of geographically-prohibited data to determine whether or not the first data is geographically-prohibited data, wherein geographically-prohibited data is restricted from being cached in the first legally-defined geographic area. If the first data is geographically-prohibited data, then the functions can also include refraining from storing the first data in data storage at the first balloon.

In yet another aspect, the present disclosure provides a balloon comprising a location determination system configured to determine a location of the balloon, a communication interface configured to receive first data, and a control system. The control system can be configured to determine that the balloon is at a location associated with a first legally-defined geographic area, wherein an area profile identifies a list of geographically-prohibited data that is restricted from being cached in the first legally-defined geographic area. The control system can also be configured to use the list of geographically-prohibited data to determine whether or not the first data is geographically-prohibited data. If the first data is geographically-prohibited data, then the control system can further be configured to refrain from storing the first data in data storage at the first balloon.

In yet another aspect, the present disclosure provides a balloon comprising a location determination system configured to determine a location of the balloon, a communication interface configured to receive first data, and a control system. The control system can be configured to determine that the balloon is at a location associated with a first legally-defined geographic area, wherein an area profile indicates, for each of one or more second legally-defined geographic areas, a list of geographically-prohibited data that is restricted from being cached in the respective second legally-defined geographic area. The control system can also be configured to use the list of geographically-prohibited data for at least one of the second legally-defined geographic areas to determine whether or not the first data is geographically-prohibited data in the at least one of the second legally-defined geographic area. The control system can also be configured to route the first data towards a destination based on the determination as to whether or not the first data is geographically-prohibited.

These as well as other aspects, advantages, and alternatives, will become apparent to those of ordinary skill in the art by reading the following detailed description, with reference where appropriate to the accompanying drawings.

DETAILED DESCRIPTION

Figure 1:
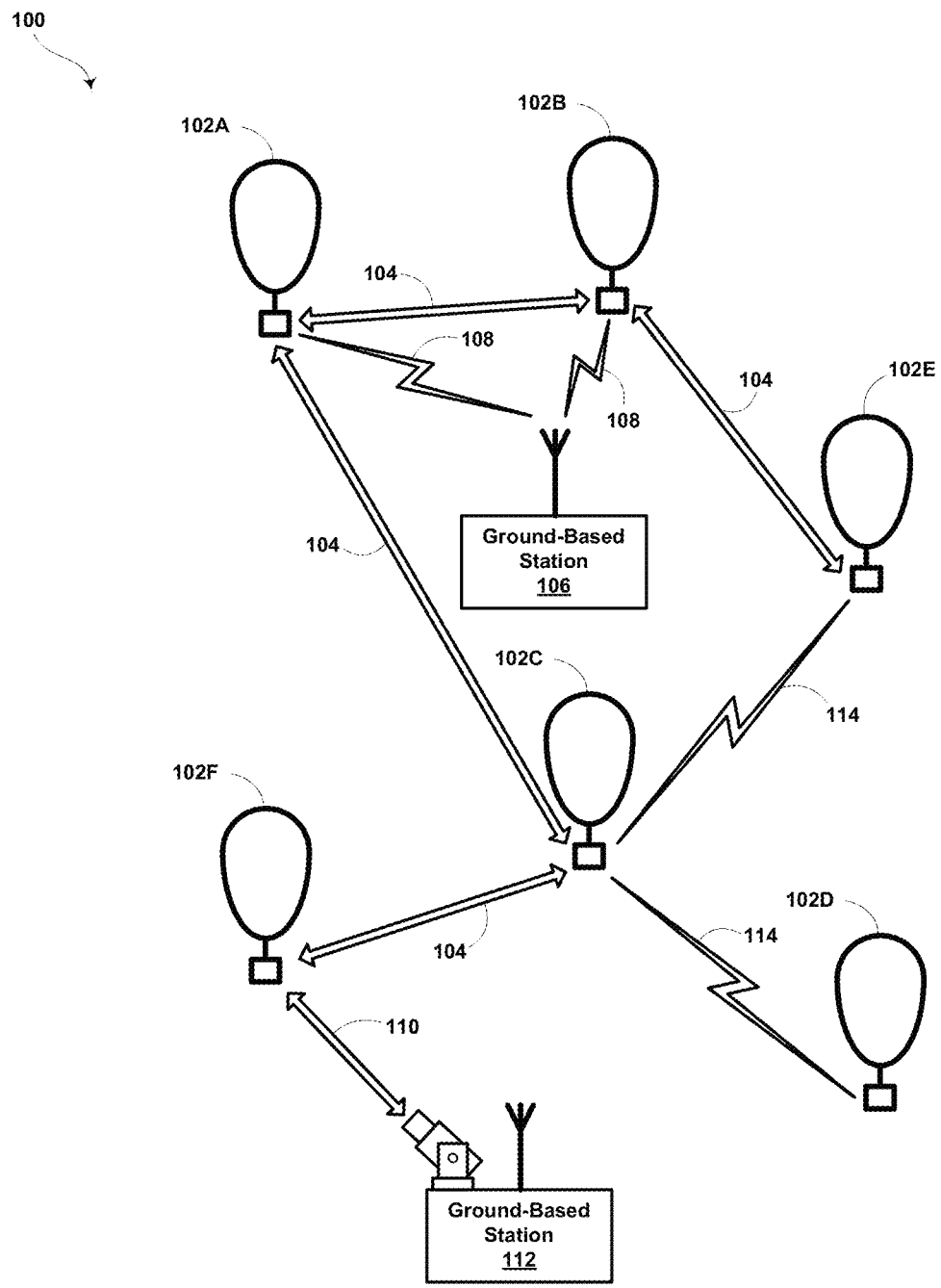
FIG. 1 is a simplified block diagram illustrating a balloon network, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

I. Overview

Exemplary embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using lasers and/or ultra-bright LEDs or lasers for optical signaling. In addition, the balloons may communicate with ground-based station(s) using radio-frequency (RF) communications.

In an exemplary balloon network, the balloons are free to move from one legally-defined geographic area to another. A legally-defined geographic area can be a country, state, city, an area defined by international law, or even an area defined by some more temporary measure (e.g., a "disaster area" or "no-fly zone" as defined periodically by the U.S. government).

Each legally-defined geographic area may have its own laws that specify whether certain data or types of data cannot be physically brought into and/or stored (e.g., cached) in that area. Herein, data that is prohibited from being brought into and/or stored in a given legally-defined geographic area may be referred to as geographically-prohibited data for the legally-defined geographic area.

Almost any type of data may be geographically prohibited in a given legally-defined geographic area, depending upon the laws and regulations of the given legally-defined geographic area. For example, certain types of user data may be geographically prohibited. As another example, certain types or classes of data may be prohibited in a certain legally-defined geographic area. As a specific example, explicit adult material might be prohibited in a given legally-defined geographic area. As yet another specific example, a law in the country of Turkey might prohibit caching of a video that defames a Turk. Many other specific examples of types of data that can be geographically prohibited are also possible as well.

As a balloon network may span over multiple legally-defined geographic areas (e.g., over a number of countries), each balloon in the balloon network may move between different legally-defined geographic areas. As such, it is desirable for a balloon in the balloon network to dynamically adjust to the laws of whichever legally-defined geographic area the balloon is located in at any given time.

For instance, consider a balloon that is positioned over China, where there may be a law prohibiting caching of data content that originated from a certain first data source (e.g., from a particular server). While positioned over China, a balloon may receive data originating from a prohibited server. Using a list of geographically-prohibited data (in this case, the list would include data originating from a prohibited server), the balloon can determine that the data is geographically-prohibited data. The balloon may then responsively refrain from storing the data in data storage at the balloon. Other examples are also possible.

However, the balloon may not remain in China. For instance, the balloon might move into Turkey, where there is no law prohibiting content from the first data source, but where there is a law prohibiting certain explicit adult material. Accordingly, the balloon may update its settings so that it operates in accord with the laws of Turkey. As such, the balloon will no longer treat content from the first data source as geographically-prohibited data, and thus may cache data content from the first data source. However, the balloon may update its setting so as to detect and treat explicit adult material as geographically-prohibited data, so long as the balloon is providing service in Turkey.

It should be understood that the above examples of the method are provided for illustrative purposes, and should not be construed as limiting. As such, the method additionally or alternatively includes other steps or includes fewer steps, without departing from the scope of the invention.

II. Exemplary Balloon Networks

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102E, which are configured to communicate with one another via free-space optical links 104. Configured as such, balloons 102A to 102E may collectively function as a mesh network for packet-data communications. Further, balloons 102A to 102D may be configured for RF communications with ground-based stations 106 via RF links 108.

In an exemplary embodiment, balloons 102A to 102E are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102E may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102E may be configured to transmit an optical signal via an optical link 104. In an exemplary embodiment, a given balloon 102A to 102E may use one or more high-power light-emitting diodes (LEDs) to transmit an optical signal. Alternatively, some or all of balloons 102A to 102E may include laser systems for free-space optical communications over optical links 104. Other types of free-space optical communication are possible. Further, in order to receive an optical signal from another balloon via an optical link 104, a given balloon 102A to 102E may include one or more optical receivers. Additional details of exemplary balloons are discussed in greater detail below, with reference to FIG. 3.

In a further aspect, balloons 102A to 102D may utilize one or more of various different RF air-interface protocols for communication ground-based stations 106 via RF links 108. For instance, some or all of balloons 102A to 102D may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102E is configured as a downlink balloon. Like other balloons in an exemplary network, a downlink balloon 102E may be operable for optical communication with other balloons via optical links 104. However, a downlink balloon 102E may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102E may additionally be operable for RF communication with ground-based stations 106. In other cases, a downlink balloon 102E may only use an optical link for balloon-to-ground communications. Further, while the arrangement shown in FIG. 1 includes just one downlink balloon 102E, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102E over an RF link 108. As such, a ground-based station 106 may be configured as an access points via which various devices can connect to balloon network 100. Ground-based stations 106 may have other configurations and/or serve other purposes without departing from the scope of the invention.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102E may collectively function as a mesh network. More specifically, since balloons 102A to 102E may communicate with one another using free-space optical links, the balloons may collectively function as a free-space optical mesh network.

In a mesh-network configuration, each balloon 102A to 102E may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102E may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102E move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102E maintaining and/or moving into a certain position relative to one or more other balloons in the network (and possibly in a certain position relative to the ground). As part of this process, each balloon 102A to 102E may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such case, a given balloon 102A to 102E may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
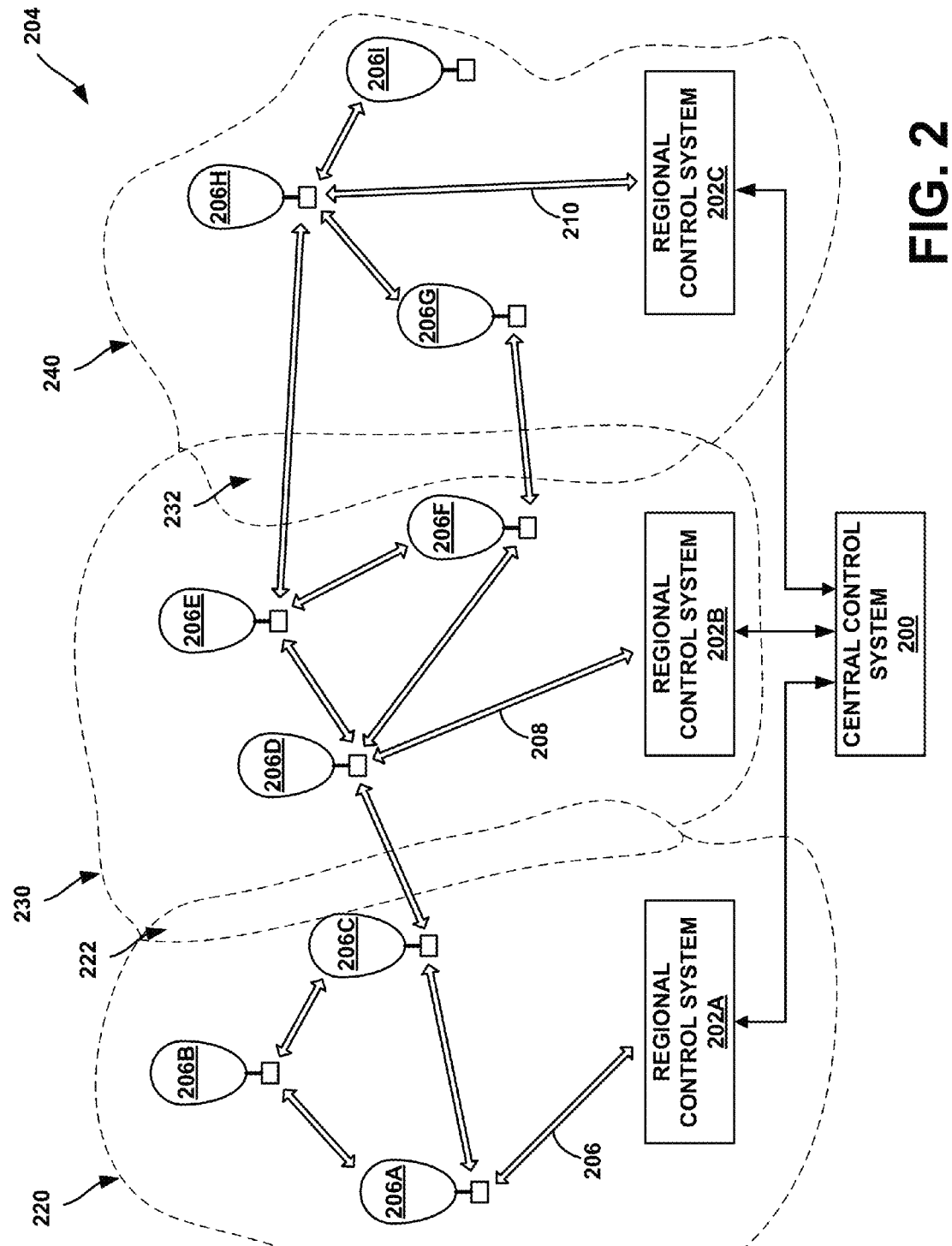
FIG. 2 is a block diagram illustrating a balloon-network control system, according to an exemplary embodiment.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

D. Legally-Defined Geographic Areas within a Balloon Network

In a further aspect, which is illustrated by FIG. 2, a balloon network may serve a coverage area that is subdivided into a number of legally-defined geographic areas 220 to 240. Further, while FIG. 2 illustrates three legally-defined geographic areas 220 to 240, more or less legally-defined geographic areas may be defined, without departing from the scope of the invention. Yet further, while legally-defined geographic areas 220 to 240 are shown as distinct coverage areas that do not overlap, it is possible that two or more legally-defined geographic areas may be defined so as to overlap (at least partially).

In one embodiment, the legally-defined geographic areas 220 to 240 represent countries. In other embodiments, some or all of the legally-defined geographic areas 220 to 240 could represent regions other than country boundaries (e.g., a city, state, or an area where international law applies). The legally-defined geographic areas 220 to 240 could also represent geographic areas that are defined on a temporary basis (e.g., "disaster area" as defined periodically by the U.S. government).

In a further aspect, the legally-defined geographic areas may be defined so as to create a substantially contiguous coverage area. For instance, in the illustrated balloon network 204, legally-defined geographic areas 220 to 240 and border areas 222 to 232 subdivide a substantially contiguous coverage area. For example, a legally-defined geographic area may be defined for each country to divide a contiguous coverage area that covers a continent with multiple countries, and possibly over an ocean as well. Further, it is possible that worldwide coverage could be substantially contiguous (possibly with some holes, such as over the North and/or South poles), and divided into legally-defined geographic areas over countries, international waters, and waters controlled by certain countries. However, it should be understood that the coverage of a balloon network may also extend to locations that are not part of any legally-defined geographic area or border area, without departing from the scope of the invention.

In an exemplary embodiment, each balloon 206A to 206I may be provided with an area profile of the respective legally-defined geographic area 220 to 240 in which the balloon is located at a given point in time. The area profile of a legally-defined geographic area may include information that indicates how to comply with the laws of that legally-defined geographic area. For example, in the illustrated state of balloon network 204, balloons 206A to 206C may store or otherwise have access to the area profile for legally-defined geographic area 220, balloons 206D to 206F may store or otherwise have access to the area profile for legally-defined geographic area 230, and balloons 206G to 206I may store or otherwise have access to the area profile for legally-defined geographic area 240.

i. Area Profile Indicating Geographically-Prohibited Data

In an exemplary embodiment, the area profile for a given legally-defined geographic area 220 to 240 takes the form of a list of certain data or certain types of data that are prohibited from being cached in the respective legally-defined geographic area (collectively referred to as "geographically-prohibited data"). Note that while the area profile may identify geographically-prohibited data, the area profile need not actually include the geographically-prohibited data. In fact, if the area profile included the data, this might be in violation of the laws that prohibit the geographically-prohibited data from being stored in the legally-defined geographic area. Thus, the fact that a balloon 206A to 206I has received and stored an area profile does not necessarily mean that it has stored the geographically-prohibited data that is identified by the area profile.

In some embodiments, the area profile for a given legally-defined geographic area could also indicate geographically-prohibited data for one or more adjacent legally-defined geographic areas. For example, a balloon 206D may include an area profile associated with a legally-defined geographic area 230. The area profile may indicate a list of geographically-prohibited data corresponding to legally-defined geographic area 230. The area profile may also indicate lists of geographically-prohibited data corresponding to legally-defined geographic area 220 and legally-defined geographic area 240.

Having an area profile that indicates geographically-prohibited data in adjacent legally-defined geographic areas may be useful if a balloon does not want to route data into a legally-defined geographic area where such data is prohibited. In one embodiment, a balloon may always route data around a legally-defined geographic area where such data is prohibited. In such an embodiment, a balloon might not need to have the area profile for the legally-defined geographic area it is in, as having the area profiles for neighboring legally-defined geographic areas may suffice. In another embodiment, a balloon may use a routing technique where routing data through the legally-defined geographic area where the data is prohibited is disfavored, but not totally out of the question. For example, the routing technique may apply a weighting factor that favors a route around the legally-defined geographic area where the data is prohibited, but that determination may be outweighed by other factors that favor routing the data through the legally-defined geographic area where the data is prohibited. In yet another embodiment, a balloon may not consider geographically-prohibited data in neighboring legally-defined geographic areas, and simply allows the balloons in the respective legally-defined geographic areas deal with identifying geographically-prohibited data and restricting its storage. Other embodiments are possible as well.

ii. Area Profile Indicating Geographically-Restricted Data

In some embodiments, an area profile may identify geographically-restricted data for a legally-defined geographic area, in addition to geographically-prohibited data. In an exemplary embodiment, the area profile for a given legally-defined geographic area 220 to 240 may identify certain geographically-restricted data or types of geographically-restricted data (collectively referred to as "geographically-restricted data") that should not leave the respective legally-defined geographic area. Accordingly, when a given balloon 206A to 206I is about to leave a given legally-defined geographic area 220 to 240, the balloon may cross-check data stored in its data storage against the area profile for the given legally-defined geographic area, in order to identify any geographically-restricted data in its data storage. If the balloon identifies any geographically-restricted data, then it may delete the geographically-restricted data before it leaves the legally-defined geographic area.

In some embodiments, the area profile may further indicate certain geographically-restricted data that must be stored at least one location within the legally-defined geographic area. Accordingly, before a balloon deletes the geographically-restricted data, the balloon may check whether the data is mirrored at another balloon or other device located in the legally-defined geographic area. If the geographically-restricted data is not mirrored, then the balloon may send the geographically-restricted data to another balloon in the legally-defined geographic area, before it moves out of the legally-defined geographic area.

In some cases, such as the example illustrated in FIG. 2, the coverage area of the balloon network may include defined border areas, which separate the legally-defined geographic areas. In the illustrated embodiment, legally-defined geographic areas 220 and 230 are separated by border area 222, while legally-defined geographic areas 230 and 240 are separated by border area 232. In one embodiment, a border area may also be treated as an area where two or more coverage areas overlap. For instance, border area 222 may be created by defining legally-defined geographic areas 220 and 230 such that these geographic areas overlap in border area 222. In another embodiment, a border area may be treated as a distinct area that separates two adjacent coverage areas.

As noted, a balloon 206A to 206I may delete geographically-restricted data in response to determining that it is likely to move out of a legally-defined geographic area. A balloon may determine that it is likely to move out of a legally-defined geographic area in various ways. Several non-limiting examples will now be provided.

In some embodiments, a balloon 206A to 206I may delete geographically-restricted data for a given legally-defined geographic area when or shortly after it moves into a border area 222 or 232 of the given legally-defined geographic area. In other words, moving into and/or remaining in the border area for a certain period of time may be considered to be an indication that the balloon is likely to move out of the legally-defined geographic area, so the balloon may responsively delete geographically-restricted data. For example, a balloon 206C may detect that it has moved from the location illustrated in FIG. 2, within legally-defined geographic area 220, to a location within border area 222. In response, balloon 206C may delete any geographically-restricted data that is identified by the area profile for legally-defined geographic area 220.

In some embodiments, balloon 206C may determine that it is likely to move out of a legally-defined geographic area 220 by checking its previous, current, and/or planned direction of movement to verify that it is heading out of legally-defined geographic area 220. Further, based on the previous, current, and/or planned direction of movement, balloon 206C may determine the probability that it will move out of the legally-defined geographic area 220. As such, when balloon 206C is located in border area 222, balloon 206C may condition the deleting of its area profile upon a determination that the probability of moving out of the legally-defined geographic area 220 is greater than a threshold probability.

Note that while the border areas 222 and 232 that are illustrated in FIG. 2 can be described and/or defined as areas that separate and/or at least partially define legally-defined geographic areas 220 to 240, legally-defined geographic areas may be defined without defining border areas. Further, border areas can alternatively be described and/or defined as areas where two or more geographic areas overlap. As yet another alternative, there may be no border areas whatsoever (either defined specifically, as areas that separate legally-defined geographic areas, or as a result of overlapping legally-defined geographic areas).

In some embodiments, balloons may request and/or receive some or all of an area profile from a ground-based station. For example, a control system may maintain a profile database indicating the settings for certain operational parameters to be used by balloons while operating in a given legally-defined geographic area and/or other data that is associated with a given legally-defined geographic area. Such a profile database may be searchable by legally-defined geographic area, such that an area profile may be determined for a given legally-defined geographic area. Accordingly, a control system may query the database to retrieve some or all of the area profile that is associated with a particular legally-defined geographic area. Further, there may be a single, central, database that is searchable to determine particular area profiles, or a number of separate databases that collectively provide the area profiles for all legally-defined geographic areas in a balloon network.

In some embodiments, the control system may be a central control system 200, which provides the area profiles for all legally-defined geographic areas in a balloon network. In other embodiments, there may be a number of regional control systems 202A to 202C, which may operate independently or may communicate with a central control system that coordinates and/or controls certain functions of the regional systems, such as is illustrated in FIG. 2.

More specifically, in the configuration illustrated in FIG. 2, regional control systems 202A to 202C may provide at least a portion of the respective area profile for each of legally-defined geographic areas 220 to 240. Accordingly, a balloon may determine its area profile according to the area profile for a given legally-defined geographic area 220 to 240 by communicating with the regional control system 202A to 202C that is associated with the given legally-defined geographic area.

Further, to determine its area profile according to its current legally-defined geographic area, a balloon may communicate directly with a regional control system 202A to 202C, or may communicate indirectly with a regional control system via other balloons and/or other ground-based stations. For example, in the illustrated state of balloon network 204, balloon 206A may send an area profile request directly to regional control system 202A. In another example, balloon 206C may send an area profile request to regional control system 202A indirectly; e.g., via balloon 206A or via balloon 206B and 206A. Other examples are possible as well.

In some embodiments, balloon 206A may not actually store some or all of the area profile. Instead, a ground-based station and/or designated balloon in the balloon network 204 may store the area profile, and other balloons in the balloon network may simply query the ground-based station and/or the designated balloon for the information from the area profile.

In one embodiment, a given balloon 206A to 206I may periodically send location update messages to one or more ground-based control systems, which indicate the balloon's location. As such, when a control system determines that a balloon has moved to a location associated with a new legally-defined geographic area, the control system may responsively send an area profile signal to the balloon, which indicates and/or provides some or all of the area profile for the new legally-defined geographic area. Further, the control system may initiate a transmission to the balloon of the geographically-prohibited data corresponding to the legally-defined geographic area.

E. Exemplary Balloon Configuration

Figure 3:
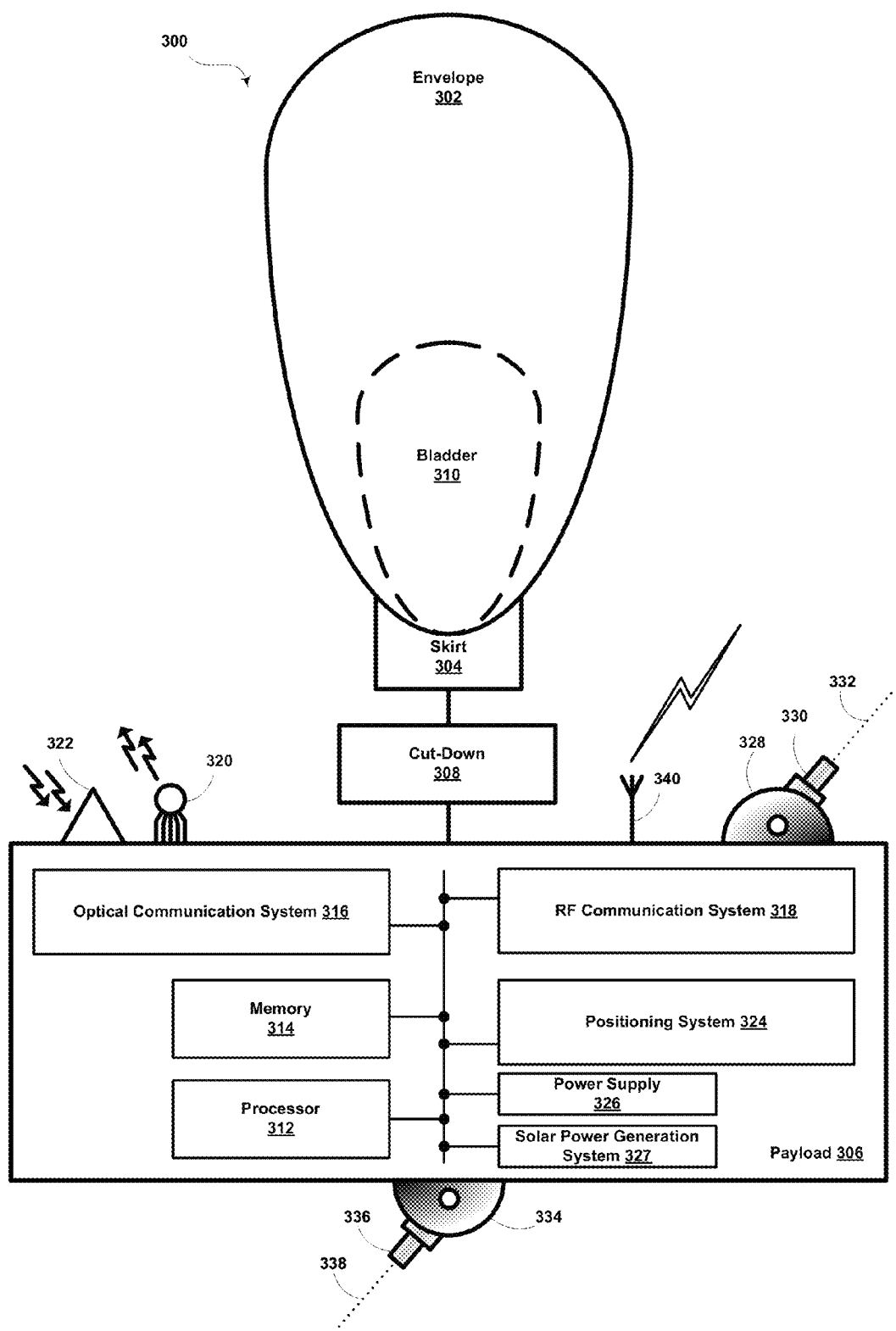
FIG. 3 shows a high-altitude balloon, according to an exemplary embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver (e.g., a photo-diode receiver system). Further, payload 306 may include an RF communication system 318, which may transmit and/or receive RF communications via an antenna system 340. The payload 306 may also include a power supply 326 to supply power to the various components of balloon 300. The payload 306 may also include a solar power generation system 327.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system make then make adjustments to the density of the balloon chamber in order to effectuate the determined altitudinal adjustments and cause the balloon to move laterally to the desired direction and/or to the desired location. Alternatively, the altitudinal adjustments may be computed by a ground-based control system and communicated to the high-altitude balloon.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

III. Balloon Network with Optical and RF Links Between Balloons

Figure 4:
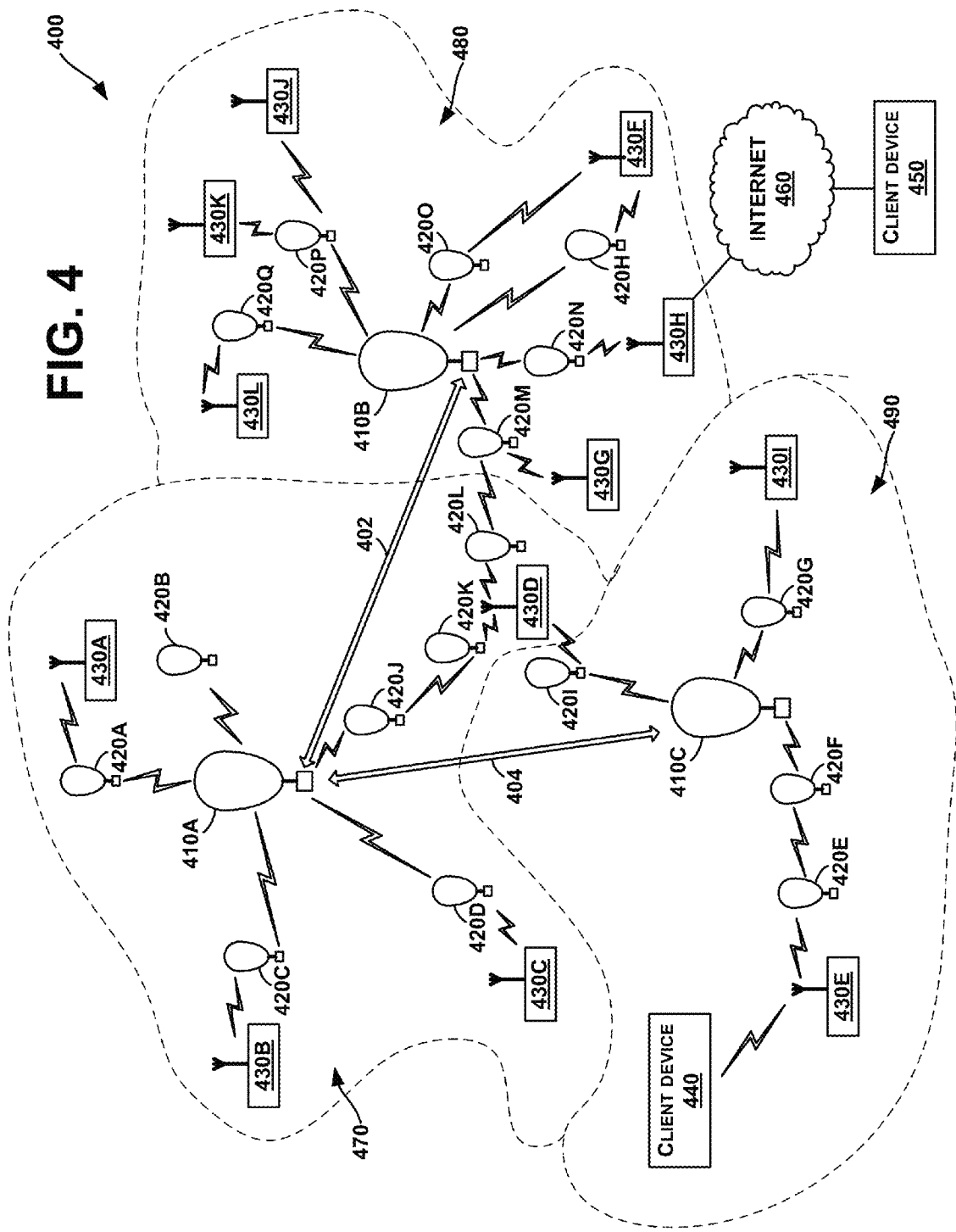
FIG. 4 is a simplified block diagram illustrating a balloon network that includes super-nodes and sub-nodes, according to an exemplary embodiment.

In some embodiments, a high-altitude-balloon network may include super-node balloons, which communicate with one another via optical links, as well as sub-node balloons, which communicate with super-node balloons via RF links. FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420A to 420Q (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420A to 420Q may include a radio-frequency (RF) communication system that is operable for packet-data communication over one or more RF air interfaces. Accordingly, some or all of the super-node balloons 410A to 410C may include an RF communication system that is operable to route packet data to one or more nearby sub-node balloons 420A to 420Q. When a sub-node 420A receives data from a super-node 410A via an RF link, the sub-node 420A may in turn use its RF communication system to transmit the received data to a ground-based station 430A to 430L via an RF link.

In some embodiments, all sub-node balloons may be configured to establish RF links with ground-based stations. For example, all sub-nodes may be configured similarly to sub-node 420A, which is operable to relay communications between super-node 410A and a ground-based station 430A via respective RF links.

In other embodiments, some or all sub-nodes may also be configured to establish RF links with other sub-nodes. For instance, in the illustrated embodiment, sub-node balloon 420F is operable to relay communications between super-node 410C and sub-node balloon 420E. In such an embodiment, two or more sub-nodes may provide a multi-hop path between a super-node balloon and a ground-based station, such as the multi-hop path provided between super-node 410C and a ground-based station 430E by sub-node balloons 420E and 420F.

Note that an RF link may be a directional link between a given entity and one or more other entities, or may be part of an omni-directional broadcast. In the case of an RF broadcast, it is possible that one or more "links" may be provided via a single broadcast. For example, super-node balloon 410A may establish a separate RF link with each of sub-node balloons 420A, 420B, and 420C. However, in other implementations, super-node balloon 410A may broadcast a single RF signal that can be received by sub-node balloons 420A, 420B, and 420C. In such an implementation, the single RF broadcast may effectively provide all of the RF links between super-node balloon 410A and sub-node balloons 420A, 420B, and 420C. Other examples are also possible.

Generally, the free-space optical links between super-node balloons have more bandwidth capacity than the RF links between super-node balloons and sub-node balloons. Further, free-space optical communication may be received at a much greater distance than RF communications. As such, the super-node balloons 410A to 410C may function as the backbone of the balloon network 400, while the sub-nodes 420A to 420Q may provide sub-networks providing access to the balloon network and/or connecting the balloon network to other networks.

As noted above, the super-nodes 410A to 410C may be configured for both longer-range optical communication with other super-nodes and shorter-range RF communications with nearby sub-nodes 420. For example, super-nodes 410A to 410C may use high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 Gbit/sec.

A larger number of high-altitude balloons may then be configured as sub-nodes, which may communicate with ground-based Internet nodes at data rates on the order of approximately 10 Mbit/sec. For instance, in the illustrated implementation, the sub-nodes 420A to 420Q may be configured to connect the super-nodes 410A to 410C to other networks and/or directly to client devices. Note that the data rates and link distances described in the above example and elsewhere herein are provided for illustrative purposes and should not be considered limiting; other data rates and link distances are possible.

In a further aspect, some or all of the super-node balloons may be configured as downlink balloons. Additionally or alternatively, some or all of sub-nodes 420A to 420Q may be configured as downlink balloons. Further, it is possible that a hierarchical balloon network such as that shown in FIG. 4 may be implemented without any downlink balloons.

Further, in some embodiments, the super-node balloons, such as super-nodes 410A to 410C, may function as a core network (i.e., a backbone network), while the sub-node balloons 420A to 420Q may function as one or more access networks to the core network of super-nodes. In such an embodiment, some or all of the sub-nodes 420A to 420Q may also function as gateways to the balloon network 400. Note also that in some embodiments, some or all of the ground-based stations 430A to 430L may additionally or alternatively function as gateways to balloon network 400.

In another aspect, it should be understood that the network topology of the hierarchical balloon network shown in FIG. 4 is but one of many possible network topologies. Further, the network topology of an exemplary balloon network may vary dynamically as super-node and/or sub-node balloons move relative to the ground and/or relative to one another. Further, as with the balloon networks illustrated in FIGS. 1 and 2, a desired topology may be specified for a hierarchical balloon network may change dynamically over time as service needs and/or goals of the network change.

Legally-defined geographic areas can be defined in a heterogeneous balloon network, such as balloon network 400. For example, as shown in FIG. 4, legally-defined geographic areas 470, 480, and 490 may be defined within the coverage area of balloon network 400.

In an embodiment where super-node balloons 410A to 410C serve as a core network, and sub-node balloons 420A to 420Q provide an access network or access networks, location-specific area profiles may only be implemented by the sub-node balloons 420A to 420Q. Alternatively, both super-node balloons 410A to 410C and sub-node balloons 420A to 420Q can implement location-specific area profiles.

Further, in some embodiments, a super-node balloon 410A to 410C may facilitate implementation of location-specific area profiles by some or all of sub-node balloons 420A to 420Q. For example, each super-node balloon 410A to 410C could store a area profile for a certain legally-defined geographic area 470 to 490, respectively. As such, a sub-node balloon 420A to 420Q could query a nearby super-node balloon for the area profile that is associated with the legally-defined geographic area in which it located or anticipates that it will soon be located. Alternatively, a super-node balloon 410A to 410C may function as a control system, in a similar manner as described above in reference to FIG. 2. Other implementations of location-specific area profiles in heterogeneous balloon networks are also possible.

IV. Examples of Methods

Figure 5:
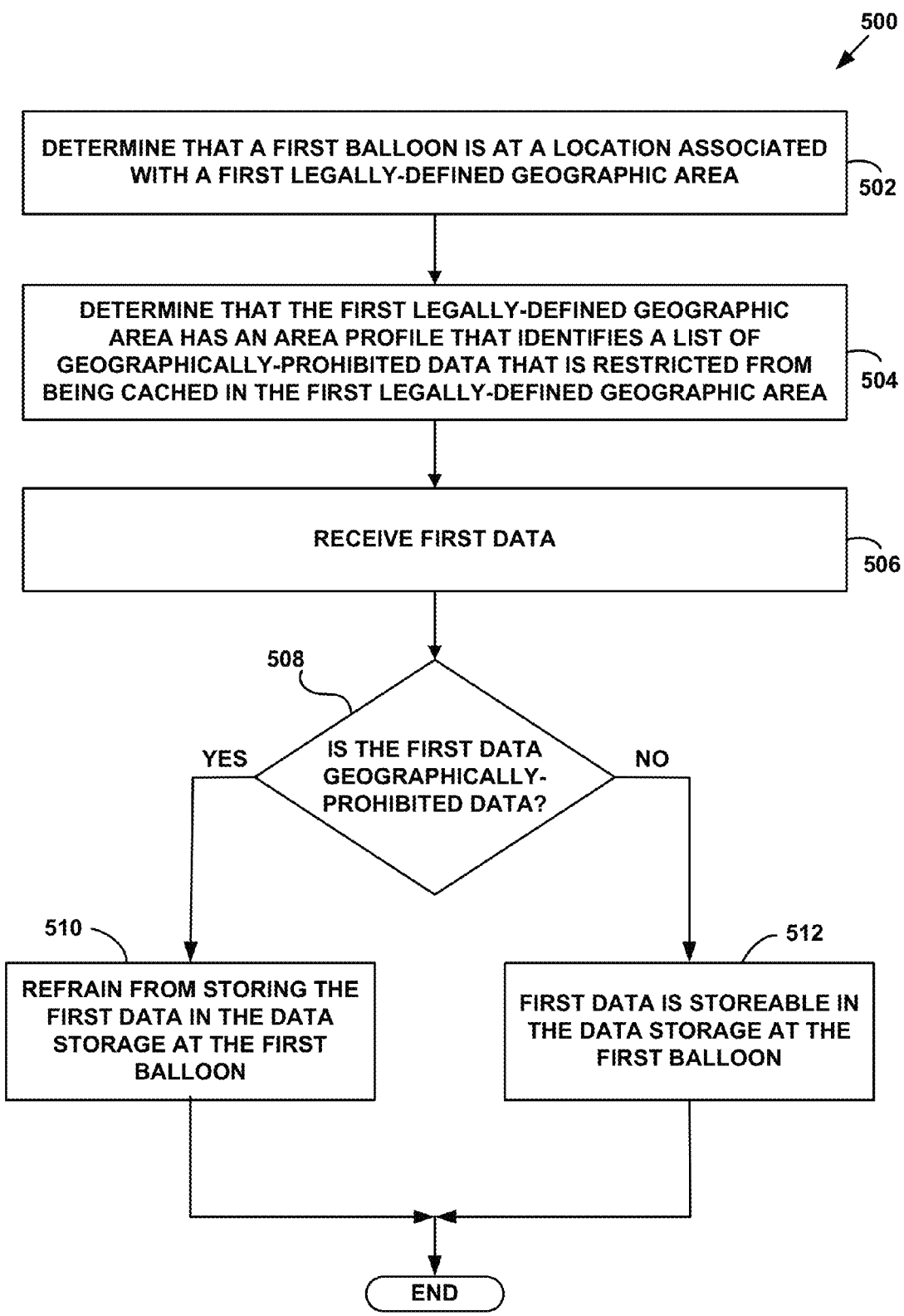
FIG. 5 is a simplified flow chart illustrating a method, according to an exemplary embodiment.
Figure 6:
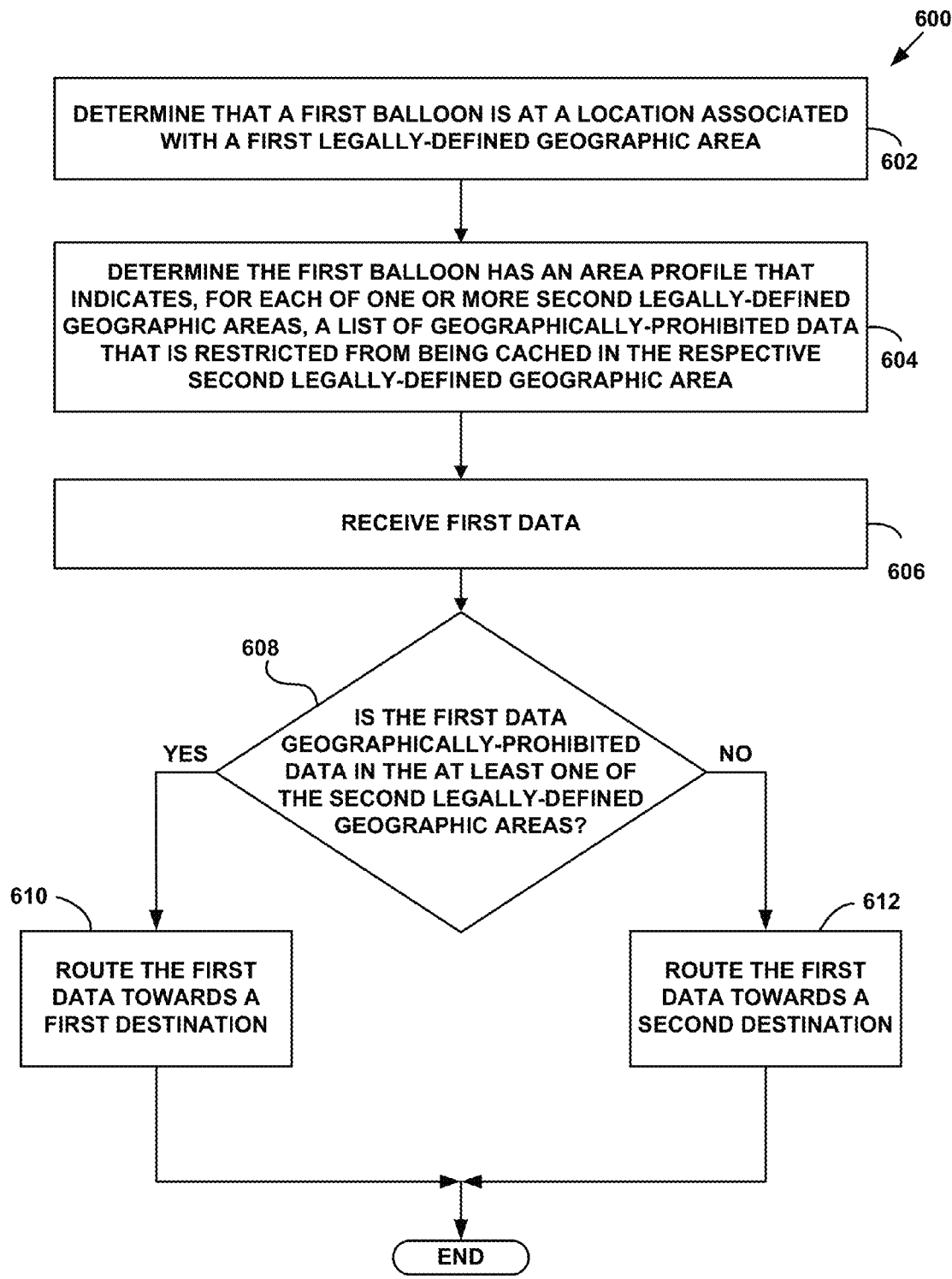
FIG. 6 is a simplified flow chart illustrating a method, according to an exemplary embodiment.

FIGS. 5 and 6 are simplified flow charts illustrating methods 500 and 600, respectively. Although the blocks in FIGS. 5 and 6 are illustrated in a sequential order, these blocks may also be performed in parallel, and/or in a different order than those described herein. Also, the various blocks may be combined into fewer blocks, divided into additional blocks, and/or removed based upon the desired implementation.

Further, while method 500 and method 600 are described by way of example as being carried out by a balloon (e.g., by a computing system of a balloon), it should be understood that an exemplary method or a portion thereof may be carried out by another entity or combination of entities, without departing from the scope of the invention.

In addition, for method 500 and method 600, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

A. Example Handling Data that is Geographically Prohibited in the Legally-Defined Geographic Area Where a Balloon is Located FIG. 5 is a simplified flow chart illustrating method 500, according to an exemplary embodiment. At block 502, method 500 involves determining that a first balloon is at a location associated with a legally-defined geographic area. In one example, referring to FIG. 3, the positioning system 324 of the first balloon may determine a current location of the first balloon to be within (e.g., located over) the legally-defined geographic area. Other embodiments are possible as well.

In one embodiment, balloons in the balloon network are provided with software for situations when a balloon could no longer determine its location. Such software may be a function of the last known location of the balloon, whether the new location of the balloon is totally unknown or harder to verify, how long the balloon has been in a geographically indeterminate state, what data the balloon is carrying, and what rules applied to that data where the balloon had been. For example, such a software system might be set so that from a last known location and traveling at a known speed and direction, the system will calculate when the balloon would be expected to leave the legally-defined geographic area and would execute its other procedures as described herein as though it were leaving this area at two minutes prior to the estimated area-exit time. The software may contain other functions as well.

At block 504, method 500 further involves determining that the first legally-defined geographic area has an area profile that identifies a list of geographically-prohibited data that is restricted from being cached in the first legally-defined geographic area. Each legally-defined geographic area may have its own rules regarding what data or types of data cannot be cached in that area. For example, an area profile may identify certain data, or certain types of data, which cannot be cached in certain legally-defined geographic areas. In one example, an area profile may identify a prohibited class of data that must not be cached in certain legally-defined geographic areas. One example of such a class of data is pornography, which cannot be cached in certain legally-defined geographic areas. In another example, an area profile may identify a prohibited instance of data that must not be cached in certain legally-defined geographic areas. For example, in China, which has a law prohibiting data content originating from a certain prohibited server. Other examples of prohibited data or prohibited types of data are possible as well.

An area profile for a legally-defined geographic area may specify operating parameters such that balloons that are located in the legally-defined geographic area will operate in accordance with the legal requirements established by the governing body of that area. Accordingly, balloons must adapt their operation to varying legal requirements of differently-governed legally-defined geographic areas as, e.g., they move from one country, state, city to another (and/or into an area where international law applies). In an example embodiment, the area profile for a first legally-defined geographic area may include a list of geographically-prohibited data that is restricted from being cached in the first legally-defined geographic area.

A balloon may use various techniques to determine the area profile for the legally-defined geographic area. In some embodiments, the balloon may request and/or receive some or all of an area profile from a ground-based station that is associated with the legally-defined geographic area for which the area profile is being requested. As such, a balloon may acquire some or all of the information making up an area profile from the ground-based station or stations that are located in or otherwise associated with the legally-defined geographic area.

For example, a control system may maintain a profile database providing information indicating the rules in a given legally-defined geographic area and/or other data that is associated with a given legally-defined geographic area. In some embodiments, the control system may be a central control system, which provides the area profiles for all legally-defined geographic areas in a balloon network. In other embodiments, there may be a number of regional control systems, which may operate independently or may communicate with a central control system that coordinates and/or controls certain functions of the regional systems.

More specifically, in the configuration with regional control systems, the regional control systems may provide at least a portion of the respective area profile for each of the legally-defined geographic areas. Accordingly, a balloon may determine its area profile according to the area profile for a given legally-defined geographic area by communicating with the regional control system that is associated with the given legally-defined geographic area. Further, to determine its area profile according to its current legally-defined geographic area, a balloon may communicate directly with a regional control system, or may communicate indirectly with a regional control system via other balloons and/or other ground-based stations. For example, a balloon may send an area profile request directly to a regional control system. In another example, a balloon may send an area profile request to a regional control system indirectly; e.g., via another balloon located in the same legally-defined geographic area.

In at least some embodiments, balloon 206A does not actually store the area profile. Instead, a ground-based station and/or designated balloon in the balloon network 204 may store the area profile, and other balloons in the balloon network may simply query the ground-based station and/or the designated balloon for the information from the area profile.

In some embodiments, some or all balloons that operate in a balloon network may be configured to broadcast an area profile signal via a designated communication channel, which indicates at least a portion of the area profile for a geographic area with which the broadcasting balloon is associated (e.g., the legally-defined geographic area in which the balloon is currently located or a legally-defined geographic area that the balloon was recently located in). In such an embodiment, block 504 may involve the balloon that seeks to determine the area profile for the first legally-defined geographic area, searching the designated communication channel for an area profile signal that indicates at least a portion of the area profile for the first legally-defined geographic area.

In a further aspect, an exemplary method may involve the balloon detecting it is in a legally-defined geographic area (e.g., determining its GPS coordinates are within boundary of a legally-defined geographic area), determining that it does not have the area profile for that legally-defined geographic area (which takes the form of or includes the list of geographically-restricted data), and requesting the profile from another balloon or ground-based station.

At block 506, method 500 further involves receiving first data. In one embodiment, the first data is sent from a device located in the first legally-defined geographic area. In another embodiment, the first data is sent from a device located outside of the first legally-defined geographic area. The device sending the first data may be a personal computer, a handheld wireless communication device, or any other device connected to the balloon network. Other embodiments are possible as well.

At block 508, method 500 further involves using the list of geographically-prohibited data to determine whether or not the first data is geographically-prohibited data. In one embodiment, the received first data is compared to the list of geographically-prohibited data by looking at metadata in the first data to determine a class or type of data, the source of the data, the target destination of the data, and/or other information. This information may then be compared with the list of geographically-prohibited data to determine if the first data is geographically-prohibited data. Other embodiments are possible as well.

If it is determined that the first data is geographically-prohibited data, the method 500 continues at block 510 with refraining from storing the first data in data storage at the first balloon. In one embodiment, a balloon may implement a routing process in which data can be cached in the data storage at the first balloon. In such an embodiment, when the balloon determines that the first data is geographically-prohibited, the balloon may alter the routing process such that the first data is not cached in the data storage at the first balloon as part of the routing process.

In one embodiment, geographically-prohibited data may be routed through a balloon without violating a law that it can't be cached. For example, when a data file is being routed through a balloon, the file may be packetized such that the balloon never stores a complete copy of the file (i.e., it only includes the packets that are in its outbound routing queue). If a data file is cached, however, the balloon may store packets as they are routed so that a complete copy of the data file is kept for later use (e.g., so it is quickly available from the balloon at a later time).

In another embodiment, the first data may be encrypted when a balloon carrying the first data is located in a legally-defined geographic area where such data is prohibited from being stored (e.g., cached). In such an embodiment, the legally-defined geographic area or a neutral third party may possess the key to decrypt the geographically-prohibited data so that the balloon owner and/or operator could not decode that piece of data. When the balloon leaves the legally-defined geographic area, the data could be decrypted, and the cache restored. Other embodiments are possible as well.

If it is determined that the first data is not geographically-prohibited data, the method 500 progresses from block 508 to block 512 with determining that the first data is storeable in the data storage at the first balloon.

B. Method for Handling Data that is Geographically Prohibited in Neighboring Legally-Defined Geographic Area(s)

FIG. 6 is a simplified flow chart illustrating method 600, according to an exemplary embodiment. At block 602, method 600 involves determining that a first balloon is at a location associated with a legally-defined geographic area, as discussed above.

At block 604, method 600 further involves determining that the first balloon has an area profile that indicates, for each of one or more second legally-defined geographic areas, a list of geographically-prohibited data that is restricted from being cached in the respective second legally-defined geographic area. For example, the area profile may indicate a first list identifying geographically-prohibited data that is restricted from being cached in a second legally-defined geographic area. Additionally, the area profile may indicate a second list identifying geographically-prohibited data that is restricted from being cached in a third legally-defined geographic area. A balloon may use various techniques to determine the area profile, as discussed above. In one embodiment, the second and third legally-defined geographic areas may be adjacent to the first legally-defined geographic area.

In one embodiment, the list of geographically-prohibited data may identify a prohibited class of data that must not be cached in certain legally-defined geographic areas. In another embodiment, the list of geographically-prohibited data may identify a prohibited instance of data that must not be cached in certain legally-defined geographic areas. Other examples of prohibited data or prohibited types of data are possible as well.

At block 606, the method 600 further involves receiving first data, as discussed above. At block 608, method 600 further involves using the lists of geographically-prohibited data to determine whether or not the first data is geographically-prohibited data in the at least one of the second legally-defined geographic areas. In one embodiment, the received first data is compared to the lists of geographically-prohibited data by looking at metadata in the first data to determine a class or type of data, the source of the data, the target destination of the data, and/or other information. This information may then be compared with the lists of geographically-prohibited data to determine if the first data is geographically-prohibited data. Other embodiments are possible as well.

If it is determined that the first data is geographically-prohibited data in the at least one of the second legally-defined geographic areas, the method 600 continues at block 610 with routing the first data towards a first destination. If it is determined that the first data is not geographically-prohibited data in the at least one of the second legally-defined geographic areas, the method 600 continues at block 612 with routing the first data towards a second destination. The first data is routed towards a particular destination based on the determination as to whether or not the first data is geographically-prohibited data.

As a specific example, a balloon is located above Country A. The balloon has an area profile indicating a first list of geographically-prohibited data that is restricted from being cached in Country B. The area profile also indicates a second list of geographically-prohibited data that is restricted from being cached in Country C. When the balloon receives data, the balloon uses the first and second lists to determine when the received data is geographically-prohibited data in either Country B or Country C. The received data is then routed towards a destination based on the determination as to whether or not the received data is geographically-prohibited. For example, if the received data is geographically-prohibited data in Country B, the received data may be routed through Country C so as to comply with the laws of Country B. Other embodiments are possible as well.

Figure 7:
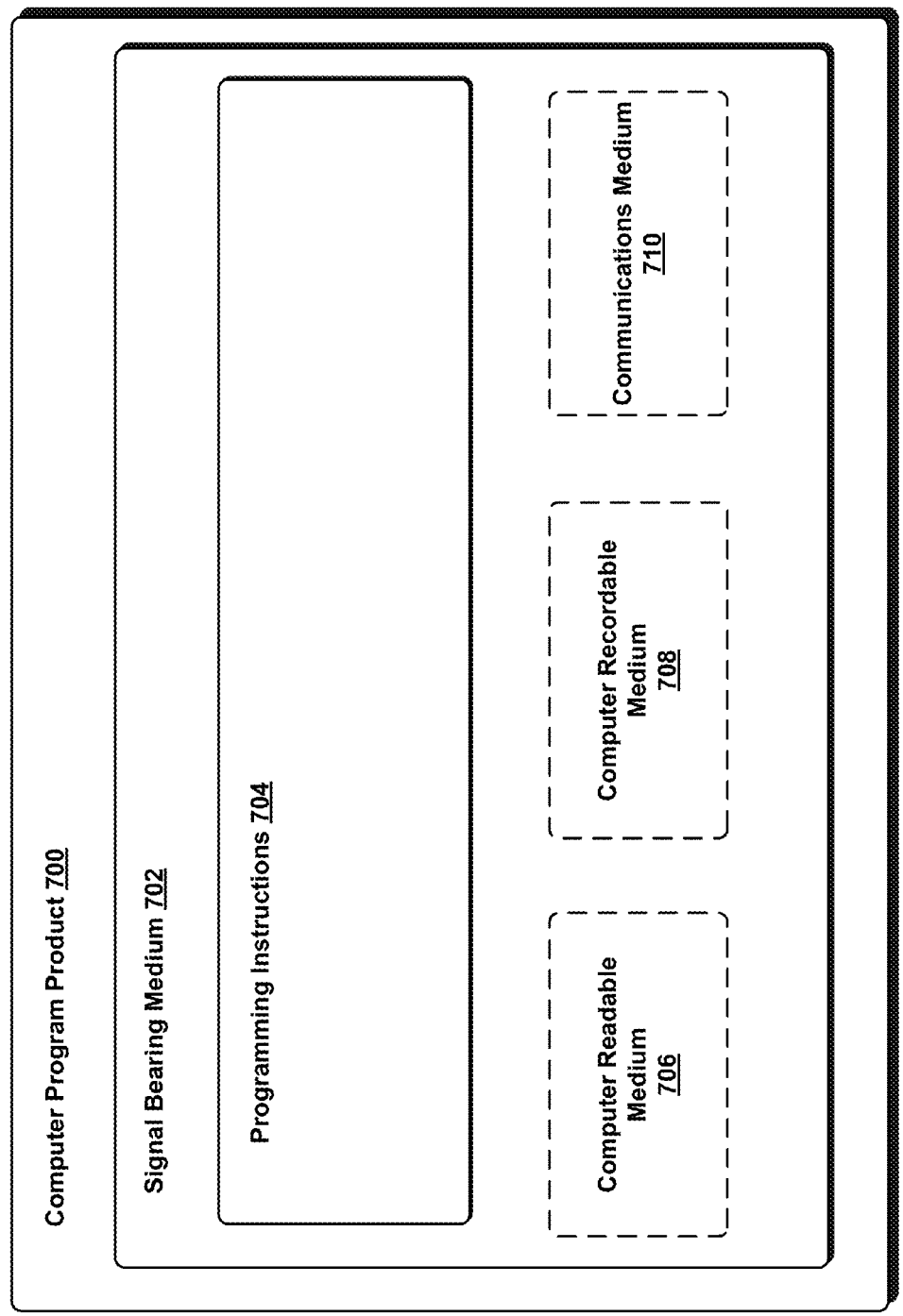
FIG. 7 depicts a computer-readable medium configured according to an example embodiment.

C. Computer-Readable Medium Configured to Handle Data that is Geographically-Prohibited FIG. 7 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor 312 of FIG. 3 is configured to provide various operations, functions, or actions in response to the programming instructions 704 conveyed to the processor 312 by one or more of the computer-readable medium 706, the computer recordable medium 708, and/or the communications medium 710.

The non-transitory computer-readable medium could also be distributed among multiple data storage elements, which could be remotely located from each other. The computing device that executes some or all of the stored instructions could be a balloon, such as the balloon illustrated in FIG. 3. Alternatively, the computing device that executes some or all of the stored instructions could be another computing device, such as a server.

V. Implementing Functionality for Both Geographically Prohibited and Geographically Restricted Data In addition to the methods described above, a balloon may implement functionality for geographically-restricted data. Each legally-defined geographic area may have its own rules regarding what data cannot be removed from that area and/or must be stored in that area. For example, an area profile may identify certain user-data, or certain types of user-data, which cannot leave a certain legally-defined geographic area. Such an area profile may be defined in accordance with privacy laws enacted in those legally-defined geographic areas, or defined for other reasons. The area profile discussed above in relation to method 500 and method 600 may further indicate such geographically-restricted data.

In one embodiment, the control system of a first balloon may scan the memory of the first balloon to determine if the first balloon contains at least some of the geographically-restricted data. The control system of the first balloon may also be configured to detect when the first balloon is likely to move out of a first legally-defined geographic area. In one embodiment, the first balloon may determine that it is likely to move out of the legally-defined geographic area by checking its previous, current, and/or planned direction of movement to verify that it is heading out of the legally-defined geographic area. Further, based on the previous, current, and/or planned direction of movement, the first balloon may determine the probability that it will move out of the legally-defined geographic area. As such, when the first balloon is located in a border area, the first balloon may condition the removal of the geographically-restricted data upon a determination that the probability of moving out of the legally-defined geographic area is greater than a threshold probability. Other embodiments are possible as well.

Once it is determined that the first balloon is likely to move out of the first legally-defined geographic area, the control system may be further configured to responsively remove the geographically-restricted data from the memory of the first balloon.

In one embodiment, the geographically-restricted data does not need to be saved, and can simply be removed from the memory of the first balloon before the first balloon leaves the legally-defined geographic area. In another embodiment, the area profile further requires that the geographically-restricted data be saved in at least one location in the legally-defined geographic area. In an example embodiment, the area profile for the legally-defined geographic area may include a list of geographically-restricted data that must be saved in at least one location in the legally-defined geographic area.

The control system may be configured to determine if a second balloon located in the first legally-defined geographic area contains the geographically-restricted data. Responsive to the determination that the second balloon does not include the geographically-sensitive data, the control system may be further configured to transfer the geographically-restricted data from the first balloon to a device that is located in the first legally-defined geographic area, before removing the geographically-restricted data from the memory of the first balloon.

In one embodiment, the device receiving the geographically-restricted data from the first balloon is a second balloon that is operable in the balloon network and is located in the legally-defined geographic area. In another embodiment, the device receiving the geographically-restricted data from the first balloon is a ground-based station located in the legally-defined geographic area. In one embodiment, the geographically-restricted data is transferred from the first balloon to the device via a RF air-interface. In another embodiment, the geographically-restricted data is transferred from the first balloon to the device via a free-space optical link.

As a specific example, geographically-restricted data that must not leave Country Z comprises data A, B, C and D. A first balloon located in Country Z includes data A and B. A second balloon located in Country Z contains data C. A third balloon located in Country Z contains data D. If it is determined that the third balloon is likely to leave Country Z, the third balloon checks to see if another balloon or ground-based station located in Country Z contains data D. If the third balloon determines that no other device in Country Z includes data D, the third balloon transfers data D to another balloon or a ground-based station located in Country Z. Then, the third balloon removes data D from its memory before it leaves Country Z so as to comply with the laws of Country Z. Other embodiments are possible as well.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. A computer-implemented method comprising:
while a first balloon is at a location within a first legally-defined geographic area, accessing a first list of geographically-prohibited data that identifies data that is restricted from being cached by the first balloon while the first balloon is at the location within the first legally-defined geographic area, wherein the first balloon is part of a balloon network including a plurality of moveable balloons that provide service to client devices in a plurality of legally-defined geographic areas;
determining that the first balloon has moved from the first legally-defined geographic area to a location within a second legally-defined geographic area;
in response to determining that the first balloon has moved to the location within the second legally-defined geographic area, the first balloon refraining from accessing the first list of geographically-prohibited data and instead accessing a second list of geographically-prohibited data that identifies data that is restricted from being cached by the first balloon while the first balloon is at the location within the second legally-defined geographic area, wherein the second list of geographically-prohibited data further indicates geographically-prohibited data for each of one or more additional legally-defined geographic areas;
while the first balloon is at the location within the second legally-defined geographic area, the first balloon receiving data;
using the second list of geographically-prohibited data to determine that the received data is geographically-prohibited data in the second legally-defined geographic area; and
responsive to a determination that the received data is geographically-prohibited data in the second legally-defined geographic area, (i) identifying a second balloon of the plurality of balloons that is at a location outside of the second legally-defined geographic area, (ii) using the second list of geographically-prohibited data to determine that the received data is not geographically-prohibited at the location of the second balloon, (iii) routing the received data to the second balloon, and (iv) refraining from caching the received data in data storage at the first balloon while the first balloon is at the location within the second legally-defined geographic area.

2. The method of claim 1, wherein the second list of geographically-prohibited data that is restricted from being cached in the second legally-defined geographic area comprises a prohibited class of data.

3. The method of claim 1, wherein the second list of geographically-prohibited data that is restricted from being cached in the second legally-defined geographic area comprises a prohibited instance of data.

4. The method of claim 1, further comprising:
the first balloon receiving the first list of geographically-prohibited data from a first ground-based station that is associated with the first legally-defined geographic area; and
the first balloon receiving the second list of geographically-prohibited data from a second ground-based station that is associated with the second legally-defined geographic area.

5. The method of claim 1, further comprising the first balloon receiving the first and second lists of geographically-prohibited data from the second balloon.

6. The method of claim 1, wherein the first balloon implements a routing process in which data cannot be cached in the data storage at the first balloon, and wherein refraining from caching the received data in the data storage at the first balloon comprises the balloon altering the routing process such that the received data is not cached in the data storage at the first balloon as part of the routing process.

7. The method of claim 1, wherein the one or more additional legally-defined geographic areas are adjacent to the second legally-defined geographic area.

8. A computer-implemented method comprising:
   determining that a first balloon has moved from outside of a first legally-defined geographic area to a location within the first legally-defined geographic area, wherein the first balloon is part of a balloon network including a plurality of moveable balloons that provide service to client devices in a plurality of legally-defined geographic areas;
   in response to determining that the first balloon has moved to the location within the first legally-defined geographic area, the first balloon accessing: (i) a first list of geographically-prohibited data that identifies data that is restricted from being cached in a second legally-defined geographic area, and (ii) a second list of geographically-prohibited data that identifies data that is restricted from being cached in a third legally-defined geographic area;
   while the first balloon is at the location within the first legally-defined geographic area, the first balloon receiving data;
   using the first list of geographically-prohibited data and the second list of geographically-prohibited data as a basis for making a determination that the received data is geographically-prohibited data in the second legally-defined geographic area but not geographically-prohibited data in the third legally-defined geographic area; and
   based on the determination that the received data is geographically-prohibited data in the second legally-defined geographic area but not geographically-prohibited data in the third legally-defined geographic area, (i) identifying a second balloon of the plurality of balloons that is at a location within the third legally-defined geographic area, and (ii) routing the received data towards the second balloon.

9. The method of claim 8, wherein the second legally-defined geographic area and third legally-defined geographic area are adjacent to the first legally-defined geographic area.

10. The method of claim 8, wherein the first and second lists of geographically-prohibited data that is restricted from being cached in the second and third legally-defined geographic area comprises a prohibited class of data.

11. The method of claim 8, wherein the first and second lists of geographically-prohibited data that is restricted from being cached in the second and third legally-defined geographic area comprises a prohibited instance of data.

12. The method of claim 8, further comprising the first balloon receiving the first and second lists of geographically-prohibited data from a ground-based station that is associated with the first legally-defined geographic area.

13. The method of claim 8, further comprising the first balloon receiving the first and second lists of geographically-prohibited data from the second balloon.

14. A non-transitory computer readable medium storing instructions that, when executed by one or more processors in a computing device, cause that computing device to perform functions, the functions comprising:
   while a first balloon is at a location within a first legally-defined geographic area, accessing a first list of geographically-prohibited data that identifies data that is restricted from being cached by the first balloon while the first balloon is at the location within the first legally-defined geographic area, wherein the first balloon is part of a balloon network including a plurality of moveable balloons that provide service to client devices in a plurality of legally-defined geographic areas;
   determining that the first balloon has moved from the first legally-defined geographic area to a location within a second legally-defined geographic area;
   in response to determining that the first balloon has moved to the location within the second legally-defined geographic area, the first balloon refraining from accessing the first list of geographically-prohibited data and instead accessing a second list of geographically-prohibited data that identifies data that is restricted from being cached by the first balloon while the first balloon is at the location within the second legally-defined geographic area, wherein the second list of geographically-prohibited data further indicates geographically-prohibited data for each of one or more additional legally-defined geographic areas;
   while the first balloon is at the location within the second legally-defined geographic area, the first balloon receiving data;
   using the second list of geographically-prohibited data to determine that the received data is geographically-prohibited data in the second legally-defined geographic area; and
   responsive to a determination that the received data is geographically-prohibited data in the second legally-defined geographic area, (i) identifying a second balloon of the plurality of balloons that is at a location outside of the second legally-defined geographic area, (ii) using the second list of geographically-prohibited data to determine that the received data is not geographically-prohibited at the location of the second balloon, (iii) routing the received data to the second balloon, and (iv) refraining from caching the received data in data storage at the first balloon while the first balloon is at the location within the second legally-defined geographic area.

15. The non-transitory computer readable medium of claim 14, the functions further comprising:
   the first balloon receiving the first list of geographically-prohibited data from a first ground-based station that is associated with the first legally-defined geographic area; and
   the first balloon receiving the second list of geographically-prohibited data from a second ground-based station that is associated with the second legally-defined geographic area.

16. The non-transitory computer readable medium of claim 14, the functions further comprising the first balloon receiving the first and second lists of geographically-prohibited data from the second balloon.

17. A balloon comprising:
   a location determination system configured to determine a location of the balloon;
   a communication interface configured to receive data; and
   a control system configured to:

while the balloon is at a location within a first legally-defined geographic area, access a first list of geographically-prohibited data that identifies data that is restricted from being cached by the first balloon while the first balloon is at the location within the first legally-defined geographic area, wherein the first balloon is part of a balloon network including a plurality of moveable balloons that provide service to client devices in a plurality of legally-defined geographic areas;

determine that the location of the balloon has moved from the first legally-defined geographic area to a location within a second legally-defined geographic area;

in response to determining that the balloon has moved to the location within the second legally-defined geographic area, refrain from accessing the first list of geographically-prohibited data and instead access a second list of geographically-prohibited data that identifies data that is restricted from being cached by the balloon while the balloon is at the location within the second legally-defined geographic area, wherein the second list of geographically-prohibited data further indicates geographically-prohibited data for each of one or more additional legally-defined geographic areas;

in response to receiving data via the communication interface while the balloon is at the location within the second legally-defined geographic area, use the second list of geographically-prohibited data to determine that the received data is geographically-prohibited data in the second legally-defined geographic area; and responsive to a determination that the received data is geographically-prohibited data in the second legally-defined geographic area, (i) identify a second balloon of the plurality of balloons that is at a location outside of the second legally-defined geographic area, (ii) use the second list of geographically-prohibited data to determine that the received data is not geographically-prohibited at the location of the second balloon, (iii) route the received data to the second balloon, and (iv) refrain from caching the received data in data storage at the first balloon while the first balloon is at the location within the second legally-defined geographic area.

18. The balloon of claim 17, wherein the balloon is a first balloon, and wherein the second list of geographically-prohibited data further indicates geographically-restricted data that must not be removed from the second legally-defined geographic area, wherein the control system is further configured to:

determine that the first balloon contains at least some of the geographically-restricted data;

detect when the first balloon is likely to move out of the second legally-defined geographic area; and when the first balloon is likely to move out of the second legally-defined geographic area, responsively remove the geographically-restricted data from the memory of the first balloon.

19. The balloon of claim 18, wherein the second list of geographically-prohibited data further indicates geographically-restricted data that must be saved in at least one location in the second legally-defined geographic area, wherein the control system is further configured to:

determine if a second balloon located in the second legally-defined geographic area contains the geographically-restricted data;

responsive to the determination that the second balloon does not include the geographically-restricted data, transfer the geographically-restricted data from the first balloon to a device that is located in the second legally-defined geographic area, before removing the geographically-restricted data from the memory of the first balloon.

20. A balloon comprising:

a location determination system configured to determine a location of the balloon;

a communication interface configured to receive data; and a control system configured to:

determine that the location of the balloon has moved from outside of a first legally-defined geographic area to a location within the first legally-defined geographic area, wherein the balloon is part of a balloon network including a plurality of moveable balloons that provide service to client devices in a plurality of legally-defined geographic areas;

in response to determining that the balloon has moved to the location within the first legally-defined geographic area, access: (i) a first list of geographically-prohibited data that identifies data that is restricted from being cached in a second legally-defined geographic area, and (ii) a second list of geographically-prohibited data that identifies data that is restricted from being cached in a third legally-defined geographic area;

in response to receiving data via the communication interface while the balloon is at the location within the first legally-defined geographic area, use the first list of geographically-prohibited data and the second list of geographically-prohibited data as a basis for making a determination as to whether or not the received data is geographically-prohibited data in the second legally-defined geographic area but not geographically-prohibited data in the third legally-defined geographic area; and based on the determination that the received data is geographically-prohibited data in the second legally-defined geographic area but not geographically-prohibited data in the third legally-defined geographic area, (i) identify a second balloon of the plurality of balloons that is at a location within the third legally-defined geographic area, and (ii) route the received data towards the second balloon.

21. The balloon of claim 20, wherein the balloon is a first balloon, and wherein the second list of geographically-prohibited data further indicates geographically-restricted data that must not be removed from the first legally-defined geographic area, wherein the control system is further configured to:

determine that the first balloon contains at least some of the geographically-restricted data;

detect when the first balloon is likely to move out of the first legally-defined geographic area; and when the first balloon is likely to move out of the first legally-defined geographic area, responsively remove the geographically-restricted data from the memory of the first balloon.

22. The balloon of claim 21, wherein the second list of geographically-prohibited data further indicates geographically-restricted data that must be saved in at least one location in the first legally-defined geographic area, wherein the control system is further configured to:
- determine if a second balloon located in the first legally-defined geographic area contains the geographically-restricted data;
- responsive to the determination that the second balloon does not include the geographically-restricted data, transfer the geographically-restricted data from the first balloon to a device that is located in the first legally-defined geographic area, before removing the geographically-restricted data from the memory of the first balloon.

\* \* \* \* \*